United States Patent Office 2,962,101
Patented Nov. 29, 1960

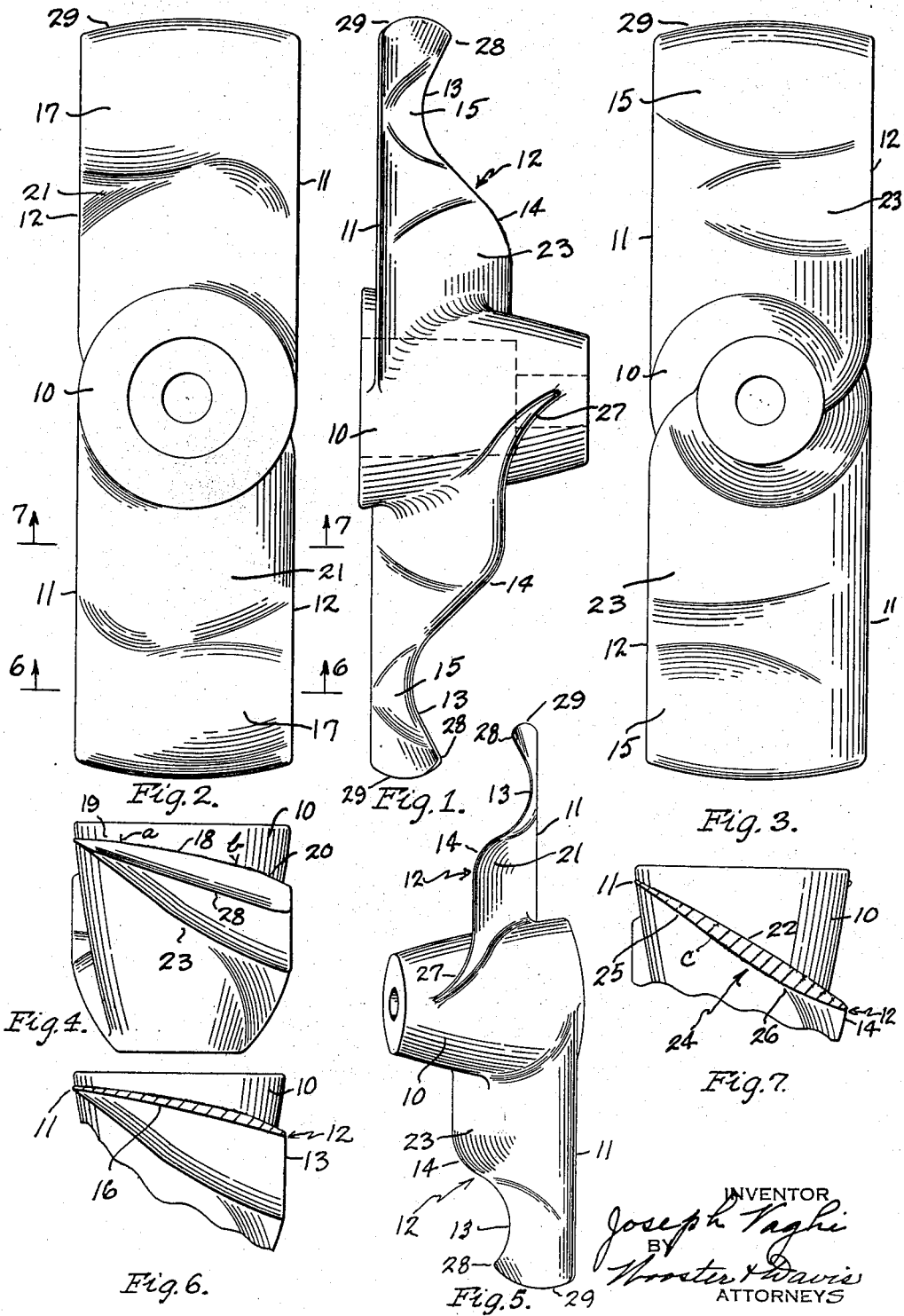

2,962,101

WATER SCREW PROPELLER

Joseph Vaghi, 32 Elizabeth St., Bethel, Conn.

Filed Feb. 12, 1958, Ser. No. 714,812

3 Claims. (Cl. 170—159)

This invention relates to a screw propeller, particularly for engines on boats, including outboard and other motors, and has for an object to provide a propeller which is more efficient than the propellers now generally employed with such motors.

It is also an object to provide such a propeller which is of simple construction and may be manufactured at low cost.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side or edge view of a propeller involving this invention;

Fig. 2 is a front view thereof looking from the left of Fig. 1;

Fig. 3 is a rear view looking from the right of Fig. 1;

Fig. 4 is a view looking toward the end of a blade and looking toward the bottom of Fig. 2;

Fig. 5 is a perspective view of the blade looking at it from an angle inclined to the axis of rotation;

Fig. 6 is a transverse section of the blade taken substantially on line 6—6 of Fig. 2, and Fig. 7 is a similar section taken substantially on line 7—7 of Fig. 2.

The propeller shown comprises a hub 10 which extends axially along its axis of rotation, and as shown tapers from the front toward the rear and is adapted for mounting on any suitable shaft driven by a suitable motor. The propeller shown comprises two blades extending radially outward from the hub in opposite directions, but it will be understood that two or more blades may be employed. Each blade comprises a straight leading edge 11 and a curved rear edge 12. When viewed directly from the front or rear of the propeller, each of the blades visually appears to be of substantially uniform transverse width because their edges 11 and 12 generally fall in spaced parallel planes that are parallel to the axis of rotation of the propeller. The rear edge comprises a plurality of reversely curved concavo-convex portions 13 and 14 which are continuations of each other, with adjacent curved portions curved in opposite directions. In the blades shown only two of these concavo-convex portions are shown, which extend across the blade, but it will be understood that for larger blades more curved portions may be used and of the same or larger size if desired.

The outer curved portion 13 of the rear edge is located adjacent the radially outer end of the blade, and leading forwardly from this curved portion is a concave depression 15 extending across the blade to substantially the leading edge 11, with its depth gradually decreasing from the rear edge to substantially the leading edge. Its bottom line, as shown in Fig. 6 at 16, is slightly concave but substantially straight. The opposite or forward surface of the blade opposite this depression 15 is a similarly shaped transverse ridge 17 extending from the rear edge to substantially the forward or leading edge, the surface thus being transversely convex and gradually decreasing in height from the rear edge to substantially the leading edge. Its top center line, as shown in Figs. 4 and 6, is somewhat convexly curved, with its center portion 18 between points a and b spaced inwardly from the edges of the blade substantially straight, and the remaining portions 19 and 20 between these points and the edges of the blades somewhat more convexly curved from this central section to the opposite edges of the blades.

The inner concavo-convexly curved portion 14 forms a continuation of the curved portion 13 and is located between the portion 13 and the hub. It is curved in the opposite direction from portion 13 with its concave side on the front of the blade, and extending from this curved portion transversely across the front surface of the blade to substantially the straight leading edge 11 is a concave depression 21, and this depression gradually varies in depth from its deepest portion at the curved edge 14 to substantially the straight edge 11. Its bottom line 22, as shown in Fig. 7, is somewhat convexly curved. The opposite or rear surface of the blade comprises a convex ridge 23 extending transversely across the rear surface of the blade, and similarly shaped to the depression 21. Its center line 24, however, as shown in Fig. 7, is somewhat concave but substantially straight for some distance, as shown at 25, extending somewhat inwardly from the leading edge 11 to about the point c, about a third the distance across the blade, and then is somewhat convex from this point to the rear edge 14, as shown at 26. The radially inner portion of the rear edge from the curved portion 14 is concavo-convexly curved in the opposite direction, as shown at 27, to run out into the surface of the hub.

The blades are feathered so as to be inclined at an angle to the axis of rotation, or a plane extending at right angles to this axis, as indicated in the drawing, and this feathering or angle of inclination varies from the hub to the outer end of the blade with the greatest angle of inclination adjacent the hub where the speed of motion of the blade is the least, and the smallest angle of inclination is adjacent the outer end of the blade where the speed of motion of the blade is the greatest.

It has been found in actual tests that this propeller has materially greater efficiency and delivers materially greater power with the same motor than does the commonly used screw-type propeller with S-shaped curved blades (when viewed from the front or rear of the propeller). The shape of the blades in my improved propeller secures a greater grip and push on the water, and the concave depressions hold the water against shifting radially outwardly or sliding off the ends of the blades, and this is particularly true of the outer depressions 15 where the speed of the blades is the greatest and therefore the centrifugal action on the water is the greatest. This shape and depression forms a somewhat overlapping edge 28 for the radially outer end edge of the blades, which retains the water in the transverse depressions 15 and prevents it from sliding radially off the ends of the blades without providing the desired push on the blades to impart forward motion to the propeller. As clearly appears in the drawings, particularly Figs. 1, 4 and 5, the overlapping edge 28 comprises a blade portion having a radially inwardly facing concavely curved surface that terminates radially in a transversely rearwardly directed outer free edge 29 of the blade. The outer free edge 29 is preferably somewhat convexly curved, although it may be substantially straight.

Having thus set forth the nature of my invention, I claim:

1. A boat propeller including a circular hub, a plurality of blades extending radially outwardly therefrom each having a straight leading edge, each blade extending transversely between spaced parallel planes that are parallel to the axis of rotation of the propeller, the rear edge of each blade including a first convexly concavely curved portion adjacent the radially outer end of the blade with a concave depression extending transversely across the blade from said rear edge on its rear surface and decreasing in depth to adjacent the straight edge, said depression providing an overlapping blade edge portion having a radially inwardly facing concavely curved surface terminating radially in a transverse rearwardly directed free edge forming the radially outer end edge of the blade, the forward surface opposite said depression comprising a convex ridge extending from said rear edge transversely across the blade and decreasing in height to adjacent the straight edge, said rear edge including a second convexly concavely curved portion between said first portion and the hub providing a continuation thereof and curved in the reverse direction from the first portion with a concave depression extending from said edge transversely across the blade on its front surface decreasing in depth to adjacent the leading edge and a convex ridge extending from said rear edge across the blade on its rear surface opposite said second concave depression and decreasing in height to adjacent the leading edge, a concavely curved surface forming a continuation of the convex surface of said latter ridge blending into the surface of the hub, and said blades being feathered so as to be inclined to a plane at right angles to the axis of rotation with the bottom line of the first concave depression substantially straight and inclined to said plane at a materially smaller angle than the bottom line of the second concave depression.

2. A boat propeller including a circular hub, a plurality of blades extending radially outwardly therefrom, each blade extending transversely between spaced parallel planes that are parallel to the axis of rotation of the propeller, each blade having a straight leading edge, the rear edge of each blade comprising radially outer and inner oppositely curved concavo-convex portions forming continuations of each other, the radially outer curved portion being adjacent the radially outer end of the blade with a concave depression extending from the rear edge transversely across the rear surface of the blade and gradually decreasing in depth to adjacent the leading edge, said depression providing an overlapping blade edge portion having a radially inwardly facing concavely curved surface terminating radially in a transverse rearwardly directed free edge forming the radially outer end edge of the blade, the forward surface opposite said depression providing a similarly curved convex ridge extending transversely across the blade, the outer curved portion of the rear edge being between the radially outer portion and the hub with a concave depression extending from this edge transversely across the forward surface of the blade and gradually decreasing in depth toward the leading edge, the rear surface opposite said latter depression comprising a similarly curved convex ridge extending transversely across the blade and a concavely curved transverse surface blending into the surface of the hub, and said blades being feathered so as to be inclined to a plane at right angles to the axis of the hub and which feathering varies from the hub to the outer end with the greatest angle of inclination adjacent the hub.

3. A boat propeller including a circular hub, a plurality of blades extending radially outwardly therefrom, each blade extending transversely between spaced parallel planes that are parallel to the axis of rotation of the propeller, each blade having a straight leading edge, the rear edge of each blade comprising radially outer and inner oppositely curved concavo-convex portions forming continuations of each other, the radially outer curved portion being adjacent the radially outer end of the blade with a concave depression extending from the rear edge transversely across the rear surface of the blade and gradually decreasing in depth to adjacent the leading edge with the bottom line of this depression substantially straight, said depression providing an overlapping blade edge portion having a radially inwardly facing concavely curved surface terminating radially in a transverse rearwardly directed free edge forming the radially outer end edge of the blade, the forward surface opposite said depression comprising a similarly curved convex ridge with its center line substantially straight at the center of the blade and convexly curved at its opposite ends toward the edges of the blade, the other curved portion of the rear edge located between the outer curved portion and the hub with a concave depression extending from this edge transversely across the forward surface of the blade and gradually decreasing in depth toward the leading edge with its bottom line somewhat convexly curved, the rear surface of the blade opposite said latter depression comprising a similarly curved convex ridge extending transversely across the blade with its top line substantially straight from the leading edge to beyond its midwidth and convexly curved toward the rear edge, a concavely curved surface forming a continuation of the surface of said latter convexly curved ridge and blending into the surface of the hub, and said blades being feathered so as to be inclined to a plane at right angles to the axis of rotation with the bottom line of the first concave depression inclined to said plane at a materially smaller angle than the bottom line of the second concave depression.

References Cited in the file of this patent

UNITED STATES PATENTS

| | | |
|---|---|---|
| 573,562 | Wittram | Dec. 22, 1896 |
| 1,861,065 | Poot | May 31, 1932 |
| 1,933,948 | Weber | Nov. 7, 1933 |
| 2,231,746 | Ballentine | Feb. 11, 1941 |